United States Patent [19]
Gallagher et al.

[11] Patent Number: 5,956,619
[45] Date of Patent: Sep. 21, 1999

[54] SATELLITE CONTROLLED POWER CONTROL FOR PERSONAL COMMUNICATION USER TERMINALS

[75] Inventors: Vijaya K Gallagher; Paul A Monte, both of San Jose; Robert A Wiedeman, Los Altos, all of Calif.

[73] Assignee: Globalstar L.P., San Jose, Calif.

[21] Appl. No.: 08/764,565

[22] Filed: Dec. 12, 1996

[51] Int. Cl.[6] ............................. H04B 7/185; H04B 7/00
[52] U.S. Cl. .............................. 455/12.1; 455/69; 455/10
[58] Field of Search ............................... 455/10, 24, 12.1, 455/69, 504, 522

[56] References Cited

U.S. PATENT DOCUMENTS

| | | | |
|---|---|---|---|
| Re. 32,905 | 4/1989 | Baran | 370/104 |
| 4,752,925 | 6/1988 | Thompson et al. | 370/104 |
| 4,752,967 | 6/1988 | Bustamante et al. | 455/12 |
| 4,777,653 | 10/1988 | Bonnerot et al. | 455/69 |
| 4,901,307 | 2/1990 | Gilhousen et al. | 370/18 |
| 4,910,792 | 3/1990 | Takahata et al. | 455/10 |
| 4,941,199 | 7/1990 | Saam | 455/10 |
| 5,010,317 | 4/1991 | Schwendeman et al. | 340/311.1 |
| 5,073,900 | 12/1991 | Mallinckrodt | 375/1 |
| 5,081,703 | 1/1992 | Lee | 455/13 |
| 5,109,390 | 4/1992 | Gilhousen et al. | 375/1 |
| 5,119,225 | 6/1992 | Grant et al. | 359/172 |
| 5,126,748 | 6/1992 | Ames et al. | 342/353 |
| 5,138,631 | 8/1992 | Taylor | 375/1 |
| 5,216,427 | 6/1993 | Yan et al. | 342/352 |
| 5,233,626 | 8/1993 | Ames | 375/1 |
| 5,239,671 | 8/1993 | Linquist et al. | 455/13.1 |
| 5,265,119 | 11/1993 | Gilhousen et al. | 375/1 |

(List continued on next page.)

FOREIGN PATENT DOCUMENTS

| | | |
|---|---|---|
| 0 421 698 A3 | 10/1991 | European Pat. Off. . |
| 0 682 416 A2 | 11/1995 | European Pat. Off. . |
| 0 748 066 A2 | 12/1996 | European Pat. Off. . |
| WO 90/13186 | 11/1990 | WIPO . |
| WO 91/09473 | 6/1991 | WIPO . |
| WO 93/09613 | 5/1993 | WIPO . |

OTHER PUBLICATIONS

"A Feedback–Loop Type Transmission Power Control for TDMA Satellite Communication Systems", Hiroshi Kazama et al., IEICE Trans. Commun., vol. E76–B, No. 5., May 1993, pp. 529–535.

"An Integrated Satellite–Cellular Land Mobile System for Europe", E. Del Re, University of Florence, Dept. of Electronics Engineering, italy, Sep. 21, 1989.

"Current and Future Mobile Satellite Communication Systems", S. Kato et al., IEICE Transactions, vol. E 74, No. 8 Aug. 1991, pp. 2201–2210.

(List continued on next page.)

*Primary Examiner*—Edward F. Urban
*Assistant Examiner*—Sam Bhattacharya
*Attorney, Agent, or Firm*—Perman & Green, LLP

[57] ABSTRACT

A system and method for controlling the transmission power of a user terminal in a satellite communications system of a type that includes a ground segment, comprised of at least one user terminal and at least one terrestrial gateway, and a space segment, comprised of a plurality of satellites in a non-geosynchronous earth orbit. The method includes the steps of (a) transmitting an uplink signal from the user terminal simultaneously to at least two satellites of the space segment and (b) receiving the uplink signal with each of the at least two satellites. The method further includes the steps of (c) determining, in the space segment, a difference value representing a difference between a received signal strength indication and a desired received signal strength indication for each of the at least two satellites; (d) in response to the difference value, generating in the space segment at least one power control command for use by the user terminal; (e) transmitting the at least one generated power control command from the space segment to the user terminal; and (f) adjusting a transmitted power of the uplink signal in accordance with the at least one power control command.

26 Claims, 7 Drawing Sheets

U.S. PATENT DOCUMENTS

| | | | |
|---|---|---|---|
| 5,303,286 | 4/1994 | Wiedeman | 379/59 |
| 5,339,330 | 8/1994 | Mallinckrodt | 375/1 |
| 5,410,728 | 4/1995 | Bertiger et al. | 455/13.1 |
| 5,415,368 | 5/1995 | Horstein et al. | 244/158 R |
| 5,422,647 | 6/1995 | Hirshfield et al. | 342/354 |
| 5,433,726 | 7/1995 | Horstein et al. | 244/158 R |
| 5,439,190 | 8/1995 | Horstein et al. | 244/158 |
| 5,446,756 | 8/1995 | Mallinckrodt | 375/200 |
| 5,448,623 | 9/1995 | Wiedeman et al. | 379/59 |
| 5,524,287 | 6/1996 | Yokoya et al. | 455/126 |
| 5,551,624 | 9/1996 | Horstein et al. | 244/158 R |
| 5,619,525 | 4/1997 | Wiedeman et al. | 375/200 |

OTHER PUBLICATIONS

"Digital Network Oriented Mobile Radio satellite System as an Integrated Part of The GSM Cellular Radio System in Europe", P. Dondl, Deutsch BUndespost/Fernmeldetechniches Zentralmt/Darmstadt, Sep. 21, 1989 Ed, Rep. Germ.

"The OmniTRACS$^R$ Mobile Satellite Communications and Positioning System", E. Tiedemann, Jr. et al., Vehicle Electronics in the 90's: Proceedings of the In'l. Congress on Transporation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium$^{TM1}$ System—A Revolutionary Satellite Communications System Developed with Innovative Applications of Technology", D. Sterling et al., IEEE, Milcom 1991, Nov. 4–7.

"Iridium: Key to Worldwide Cellular Communications", J. Foley, Telecommunications, Oct. 1991, pp. 23–28.

Petition of American Mobile Satellite Corporation Before the FCC, Washington, DC 20554, dated Jun. 3, 1991, pp. 1–15.

Application of Motorola Satellite Communications, Inc. or Iridium A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey$^{SM}$ before the FCC, Washington, D.C. 20554, May 31, 1991 pp. 33–51.

Application of Ellipsat Corporation Ellipsat for the Authority to Construct Ellipso$^R$I An Elliitical Orbit Satellite System, before the FCC, Washington, D.C. 20554, Nov. 2, 1990, pp. 5–34.

Application of Loral Cellular Systems, Corp., Globalstar Mobile COmmunications Wherever You Are, before the FCC, Washington, D.C. Jun. 3, 1991, pp. 94–187.

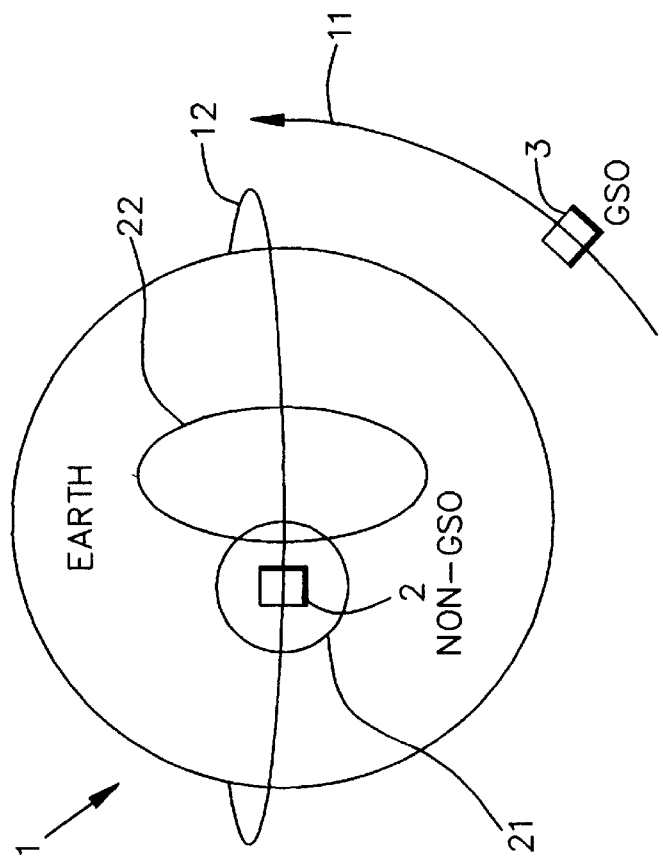
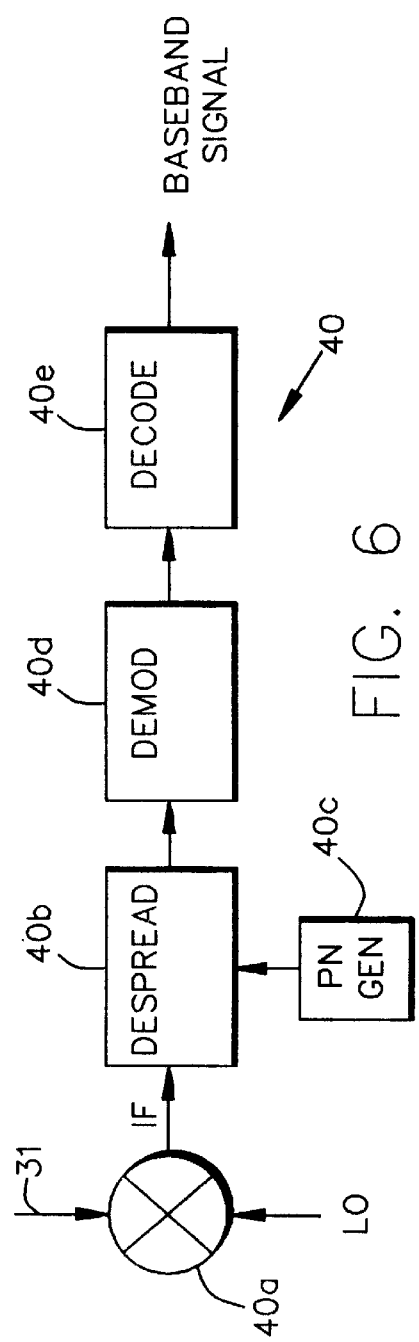

SATELLITE CONTROLLED POWER CONTROL FOR PERSONAL COMMUNICATION USER TERMINALS

FIELD OF THE INVENTION

This invention relates generally to satellite communications systems and, in particular, to RF power control techniques in both geosynchronous orbit (GSO) and non-geosynchronous orbit (non-GSO) satellite communications systems.

BACKGROUND OF THE INVENTION

Satellite telephone systems for fixed and mobile communications are emerging as a new global business. These systems utilize many individual circuits routed through one satellite or a constellation of many satellites to effect communications. The value of the satellite telephone system is that it provides ubiquitous coverage of large areas of the earth without the construction of many small terrestrial cells. Since the allocation of frequencies for satellite services, a number of proposals have been advanced for the deployment of satellite communications systems. In general, these proposals have involved either a Time Division Multiple Access (TDMA) technique or a Code Division Multiple Access (CDMA) technique.

In addition, there have been two general proposals advanced for the satellite operation itself. The first proposal is for an onboard processing design which involves processing and multiplexing, for feederlink bandwidth reduction, on the satellite itself. Onboard processing involves reducing an uplinked communications signal to baseband (i.e., to digital bits), and then possibly switching the signal, via inter-satellite links, to another satellite for downlinking. The second proposal uses a "bent" pipe satellite transponder as a classical repeater to receive, frequency shift, and transmit (repeat) signals without any processing on the satellite or any reduction of the signals to baseband.

With the first type of system (i.e., the onboard processing system) a terrestrial gateway, which functions as a ground insertion point to the Public Switched Telephone Network (PSTN), may be located at any arbitrary place. Onboard processing of signals has many advantages which can be traded off against the simplicity of the "bent pipe" repeater. One significant advantage of onboard processing is that the user communications traffic signals (e.g., voice and/or data), and any required signaling for control of user terminals and other devices, is established and performed o n the satellite. Furthermore, as in CDMA systems, self-interference can be avoided on the down links, thereby increasing the capacity of the system. Further it can be appreciated that routing of signals between various satellite node points can be effected, through inter-satellite links, thereby allowing a significant amount of flexibility in call connection. Finally, conservation of spectrum can be effected by utilizing that portion of the spectrum which may be unused due to the system inefficiency of the "bent pipe" architecture.

It should thus be appreciated that an advantage of on-board processing is that signals arriving at or being sent from the satellite may be controlled on the satellite by information received at the satellite, or as relayed from the satellite to a control point. Typically this control point has been a ground station.

It should thus be further appreciated that this latter technique requires that the control point (e.g., ground station) must be made more complex in order to participate in the control loop. It would be desirable, then, to simplify the overall system and control point complexity.

Reference in this regard can be had to the following U.S. Pat. Nos.: 4,991,199, Saam, "Uplink Power Control Mechanism For Maintaining Constant Output Power From Satellite Transponder"; 4,752,967, Bustamante et al., "Power Control System For Satellite Communications"; 5,339,330, Mallinckrodt, "Integrated Cellular Communications System"; 4,752,925, Thompson et al., "Two-Hop Collocated Satellite Communications System"; 5,126,748, Ames et al., "Dual Satellite Navigation System And Method"; 5,109,390, Gilhousen et al., "Diversity Receiver In A CDMA Cellular Telephone System"; and 5,138,631, Taylor, "Satellite Communication Network".

Reference can also be had to commonly assigned and allowed U.S. patent application: Ser. No.: 08/467,209, filing date: Jun. 06, 1995, entitled "Closed Loop Power Control For Low Earth Orbit Satellite Communications System", by Robert A. Wiedeman and Michael J. Sites.

OBJECT OF THE INVENTION

It is an object of this invention to provide a power control technique which applies control autonomously from a satellite system, thus simplifying the ground station and reducing system complexity.

SUMMARY OF THE INVENTION

The foregoing and other problems are overcome and the object of the invention is realized by methods and apparatus in accordance with embodiments of this invention.

This invention pertains to satellite communications systems that include non-GSO satellites. The invention employs power control loops which satisfy the need to individually control the power of each user terminal by means of satellite on-board processing, and not with a central, ground-based gateway earth station.

In accordance with an aspect of this invention there is disclosed a method for controlling the transmission power of a user terminal in a satellite communications system of a type that includes a ground segment, comprised of at least one user terminal and at least one terrestrial gateway, and a space segment, comprised of a plurality of satellites. The method includes the steps of (a) transmitting an uplink signal from the user terminal simultaneously to at least two satellites of the space segment and (b) receiving the uplink signal with each of the at least two satellites. The method further includes the steps of (c) determining, in the space segment, a difference value representing a difference between a received signal strength indication and a desired received signal strength indication for each of the at least two satellites; (d) in response to the difference value, generating in the space segment at least one power control command for use by the user terminal; (e) transmitting the at least one generated power control command from the space segment to the user terminal; and (f) adjusting a transmitted power of the uplink signal in accordance with the at least one power control command.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 is a simplified diagram that illustrates a relationship of a non-geosynchronous orbit (NGSO) satellite constellation and a GSO satellite constellation with respect to the earth and to one another;

FIG. 6 is a simplified block diagram of circuitry suitable for reducing a received user transmission to baseband.

DETAILED DESCRIPTION OF THE INVENTION

Figure 2:
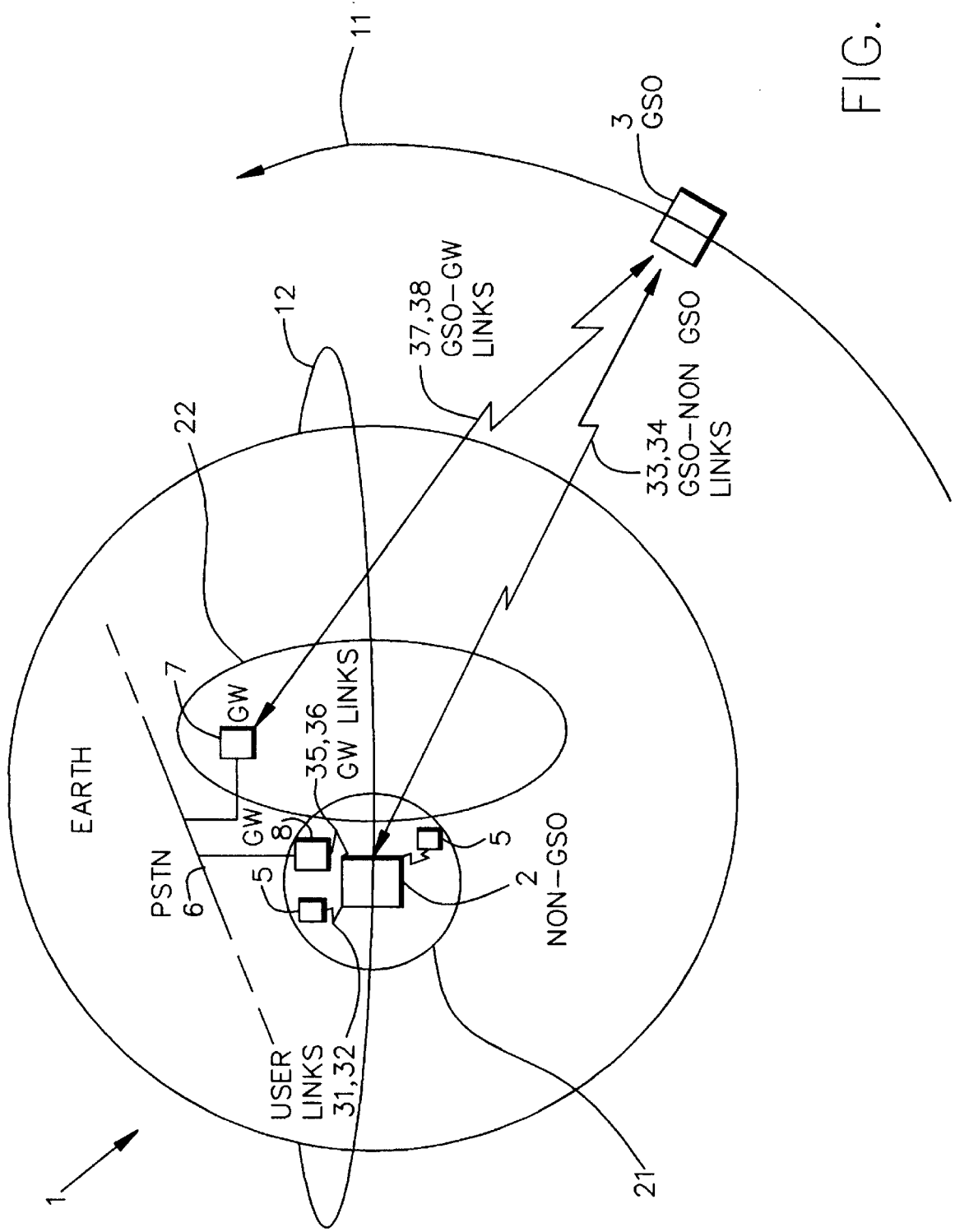
FIG. 2 is a more detailed view of FIG. 1 and shows various user terminals, non-GSO gateways, GSO gateways, and various communications links between these components.

Referring to FIG. 1, and by way of introduction, in accordance with the teaching of this invention there is described a technique for supplementing a first or primary NGSO satellite constellation, such as a low earth orbit (LEO) satellite constellation, with a secondary, higher orbit constellation (Medium Earth Orbit (MEO) and/or GSO constellation(s)) so as to improve the control over user terminal and satellite power consumption. The following U.S. Patents teach various aspects of a LEO satellite constellation, and the associated communication system: U.S. Pat. No. : 5,552,798, issued Sep. 03, 1996, entitled "Antenna for Multipath Satellite Communication Links", by F. J. Dietrich and P. A. Monte; U.S. Pat. No. : 5,422,647, issued Jun. 06, 1995, entitled "Mobile Communication Satellite Payload", by E. Hirshfield and C. A. Tsao; U.S. Pat. No. : 5,504,493, issued Apr. 02, 1996, entitled "Active Transmit Phased Array Antenna with Amplitude Taper", by E. Hirshfield; U.S. Pat. Nos. 5,448,623, issued Sep. 05, 1995, and 5,526,404, issued Jun. 11, 1996, "Satellite Telecommunications System Using Network Coordinating Gateways Operative with a Terrestrial Communication System", by R. A. Wiedeman and P. A. Monte; and U.S. Pat. No. 5,233,626, issued Aug. 03, 1993, entitled "Repeater Diversity Spread Spectrum Communication System", by S. A. Ames. The disclosures of these U.S. Patents is incorporated by reference herein in their entireties. As will be made apparent below, these teachings are modified so as to provide, in some embodiments, on-board satellite processing of received user terminal transmissions, and inter-satellite links.

In a presently preferred embodiment of this invention the LEO satellite constellation 10 includes satellites 10a at an altitude of ≈1400 km in eight circular planes offset by 45°, inclined at 52° relative to the equator with six satellites 10a in each plane (which may be referred to as a Walker constellation). To optimize the effectiveness of the coverage, path diversity is employed to mitigate against local obstructions such as trees, buildings, and mountains. Path diversity requires that a user terminal on the ground have a simultaneous view of two or more satellites at elevations above about 10° over the horizon. The LEO constellation described above provides multiple satellite coverage.

FIG. 1 illustrates a general configuration of a satellite system 1 in accordance with the teaching of this invention. The satellite communications system 1 includes a non-geosynchronous orbit (NGSO) satellite or a plurality of NGSO satellites 2, which may be referred to collectively as a satellite constellation. This constellation may be similar to that described in foregoing U.S. Patents, although the teaching of this invention should not be read to be limited to only this particular type of LEO system. The NGSO satellites 2 orbit the earth in the non-geosynchronous orbit 12. It is not necessary that there be more than one satellite 2, however, the preferred configuration contains many satellites. Each satellite 2 has an associated earth coverage area 21. FIG. 1 also shows as a preferred embodiment a geosynchronous (GSO) satellite 3 which orbits the earth in a synchronous orbit 11. A synchronous orbit is one in which the satellite 3 does not have apparent movement with respect to points on the earth. The GSO satellite 3 has an associated earth coverage area 22 which, because of the difference in altitude with respect to the non-GSO satellites 2, is significantly larger than the coverage area 21.

It should be noted that it is not necessary for the satellite 3 to be in a GSO orbit, but in fact may be non-geosynchronous as well. For example, the satellite 3 could be in a medium earth orbit (MEO). Also, there are typically more than one of the satellites 3 for providing whole earth or near whole earth support for the NGSO satellites 2. However, in any case the satellite 3 should be at a greater altitude than the satellites 2. The NGSO constellation and the higher altitude orbiting constellation may be collectively referred to as the space segment of the satellite communications system.

Reference is now made to FIG. 2 for illustrating the various elements that link the system 1 together. User terminals 5 and ground stations or gateways (GWs) 7 and 8, which collectively form all or a portion of a ground segment of the satellite communications system, are located on or near the surface of the earth. Within the coverage area 21 of the NGSO satellites 2 there is at least one, but typically many, user terminals 5,, which may be fixed, handheld, or mobile terminals capable of voice and/or data transmission and reception. The user terminals 5 communicate over links to the NGSO satellites 2 using an uplink 31 and a downlink 32. These signals may be routed on the NGSO satellite 2 to a NGSO gateway (GW-NGSO) 8 within the coverage area 21 of the NGSO satellite 2, or may be routed via the GSO satellite 3 to the gateway (GW-GSO) 7 within the coverage area 22 of the GSO satellite 3. The links to the GW-NGSO 8 provide connectivity to the public switched network (PSTN) 6 and/or to private networks. The user terminals 5 are connected to GW-NGSO 8 via the user links 31 and 32 and the NGSO satellite 2, with an uplink 35 and a downlink 36 between the NGSO satellite 2 and the GW-NSGO 8. Alternatively, the user terminals 5 may be connected to themselves directly through the NGSO satellite 2, and not routed to a gateway. In addition, the user terminals 5 may be connected to the GW-GSO 7 within the coverage area 22 of the GSO satellite 3. The GW-GSO 7 may also be connected to the PSTN 6 and/or to private networks.

Operating power on a satellite is a valuable resource which must be controlled, since there is at any given time a finite amount of available power. In general, with a NGSO satellite system, the power available from the constellation of satellites is directly proportional to a number of communications circuits that may be supported in the busiest or peak hour, as the peak hour progresses around the earth from time zone to time zone. As such, at any instant, the satellites which are orbiting over an area can deliver a certain amount of communications circuits to the area depending on the state of the power system, the number of satellites covering the area, and the amount of spectrum available to be utilized. If it is assumed that the amount of spectrum is not a limiting factor, then the number of available satellites and the available amount of power are the two dominant factors.

Figure 3B:
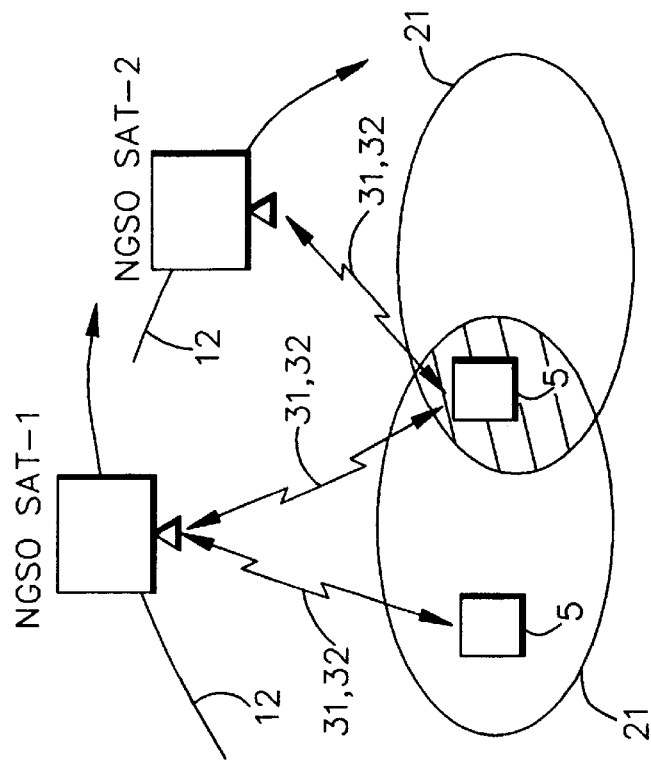
FIG. 3B illustrates a case where a user terminal is operated in an overlapped area between two NGSO satellite coverage regions.
Figure 3A:
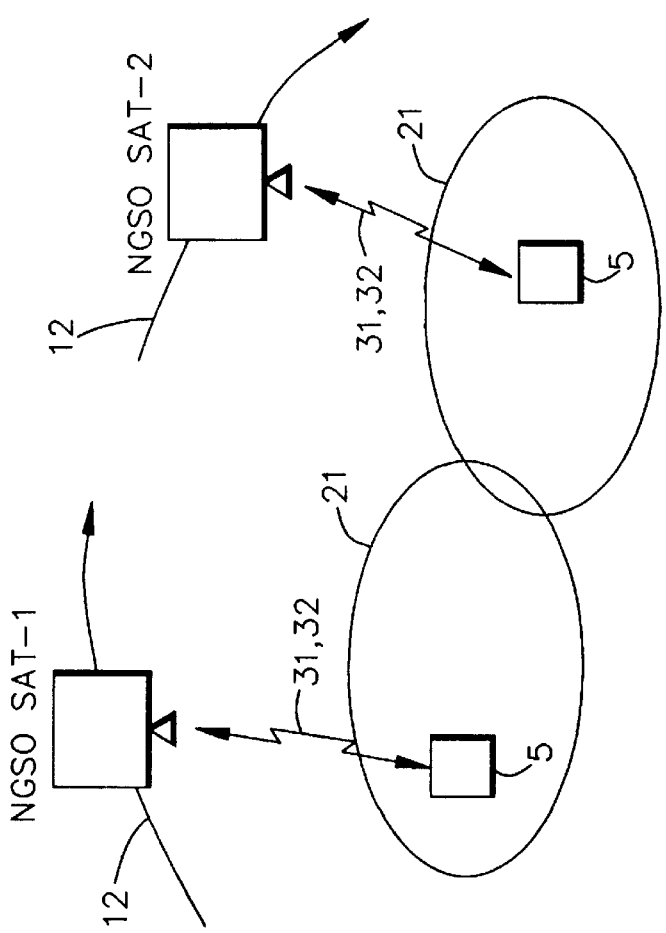
FIG. 3A illustrates a case where two user terminals are operated in non-overlapping NGSO satellite coverage regions.

Reference is now made to FIGS. 3A and 3B for illustrating two different embodiments of NGSO systems. In constellation A (FIG. 3A), the coverage areas or regions 21 of the NGSO satellites 2 do not substantially overlap, the user terminals 5 within the coverage regions 21 do not compete for resources from one NGSO satellite, and the power used is drawn from one satellite at a time for each user terminal. However, in constellation B (FIG. 3B), the coverage regions 21 substantially overlap one another, the user terminals 5 within the overlapping coverage zones compete for resources from two or more NGSO satellites 2, and power may be drawn from more than one satellite 2 at a time for a given user terminal.

For both of the configurations shown in FIGS. 3A and 3B the power cost of the links in both directions is important.

Figure 3C:
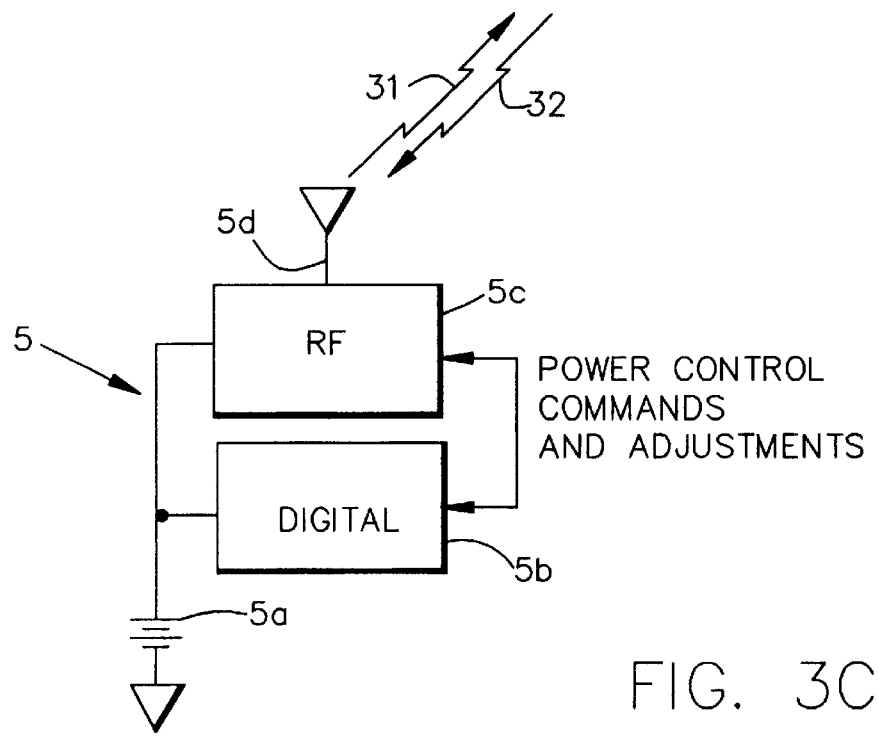
FIG. 3C is a simplified block diagram of a user terminal.

Referring briefly to FIG. 3C, the user terminal 5, in mobile and portable configurations, has a battery 5a which supplies power to a digital section 5b, including a user terminal control processor, and an RF section 5c, comprised of a transmitter, a receiver, and related RF signal handling components. The function of these various sections is to enable the links 31 and 32 to be established and maintained, via antenna 5d, for transmitting and receiving voice and/or data communications.

Figure 3D:
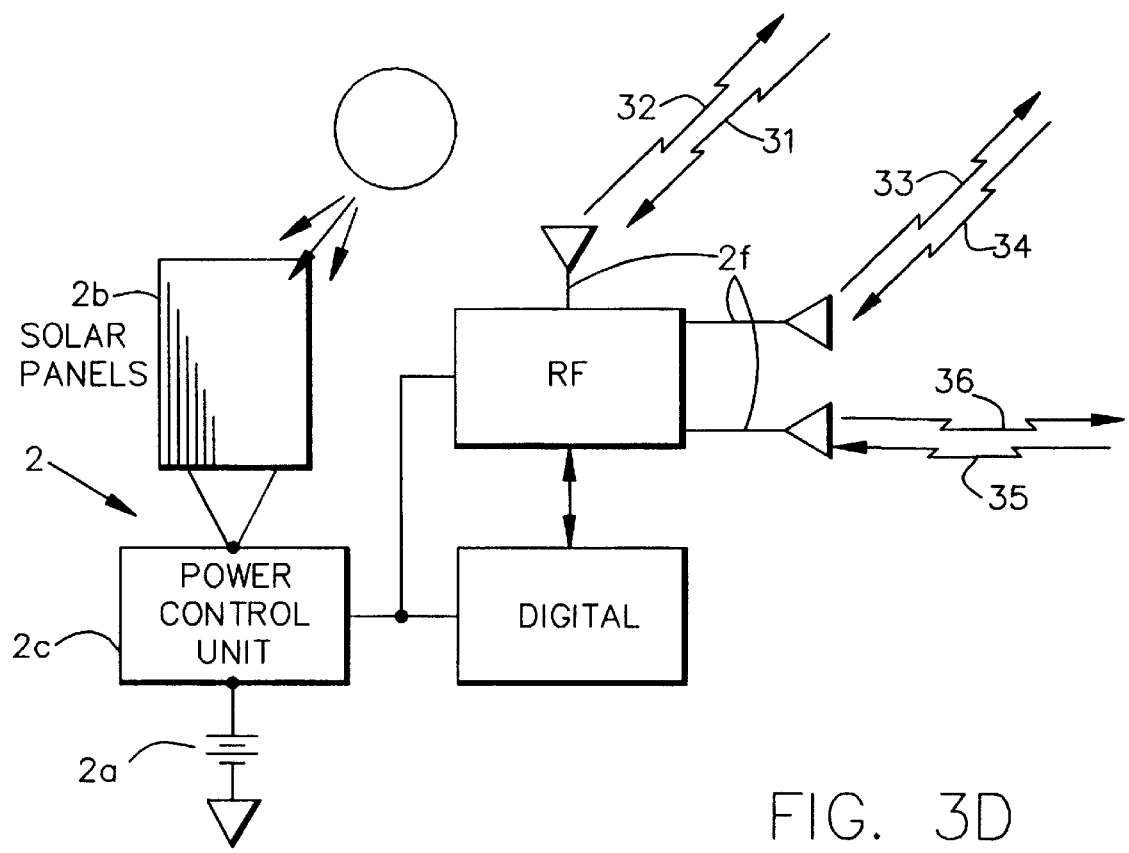
FIG. 3D is a simplified block diagram of one of the NGSO satellites.

Referring also to FIG. 3D, the NGSO satellite 2 has battery 2a which is charged from one or more solar panels 2b through a power control unit 2c. When the solar panels 2b are not providing power (during eclipse), the operating power for a digital section 2d and RF section 2e must be supplied from the battery 2a, via the power control unit 2c, to establish and maintain the links 31, 32, 35, 36, 37 and 38 through appropriate antennas 2f.

In the case of both FIGS. 3C and 3D it is important to carefully control the amount of current drawn from the batteries 5a and 2a, and to also minimize the weight and size of the batteries. For the NGSO satellite 2, it is also important to minimize the weight and size of the solar panels 2b, since solar power generators are typically costly to build and to launch. Since the cost of launching a satellite is a strong function of the weight that will be lifted, the available power in watts and watt-hours that can be obtained with reasonably sized batteries and solar panels determines, to a large degree, the financial viability of the satellite communications system.

In order to minimize the weight of the battery 5a of the user terminal 5 and to minimize the cost and weight of the satellite power system (2a–2c), it is useful to only transmit the minimum power necessary to close the RF links 31 and 32 to the user terminals 5. Since the links 31 and 32 are subject to various impairments, a variable amount of power is necessary to overcome the impairments. The specific nature of the impairments depends on the nature of the operation, the type of system modulation being transmitted, and the slant range between the user terminal 5 and the satellite(s) 2.

It should be noted that in the NGSO satellite system the slant range is constantly varying as the satellites 2 move overhead. Some, but not all, of the various impairments that can be experienced include impairments due to foliage absorption and diffraction, impairments due to building blockage or other obstructions in any frequency band, and impairments due to rain attenuation in frequency bands above 5 GHz.

Furthermore, certain types of signal modulation operate most effectively if all user terminal transmissions are controlled to a certain level, independent of impairments, slant ranges, and other variations. One type of signal modulation that behaves in this manner is Spread Spectrum utilizing Code Division Multiple Access, or SS/CDMA. In SS/CDMA the system goal is to bring all user terminal 5 transmitted up-link signals 31 in a certain frequency channel to approximately the same power density after reception by the satellite receive antenna 2. The power control system to keep the user terminals 5 at the same or at the minimum power level, after reception at the satellite antenna, is independent of the modulation scheme, impairment, or frequency band chosen.

As an example, consider rain attenuation in the Ka frequency bands of 28 GHz in a SS/CDMA system utilizing the configuration shown in FIG. 3B. The principle applies to other frequencies, links, types of impairments, and system modulation techniques.

Figure 4:
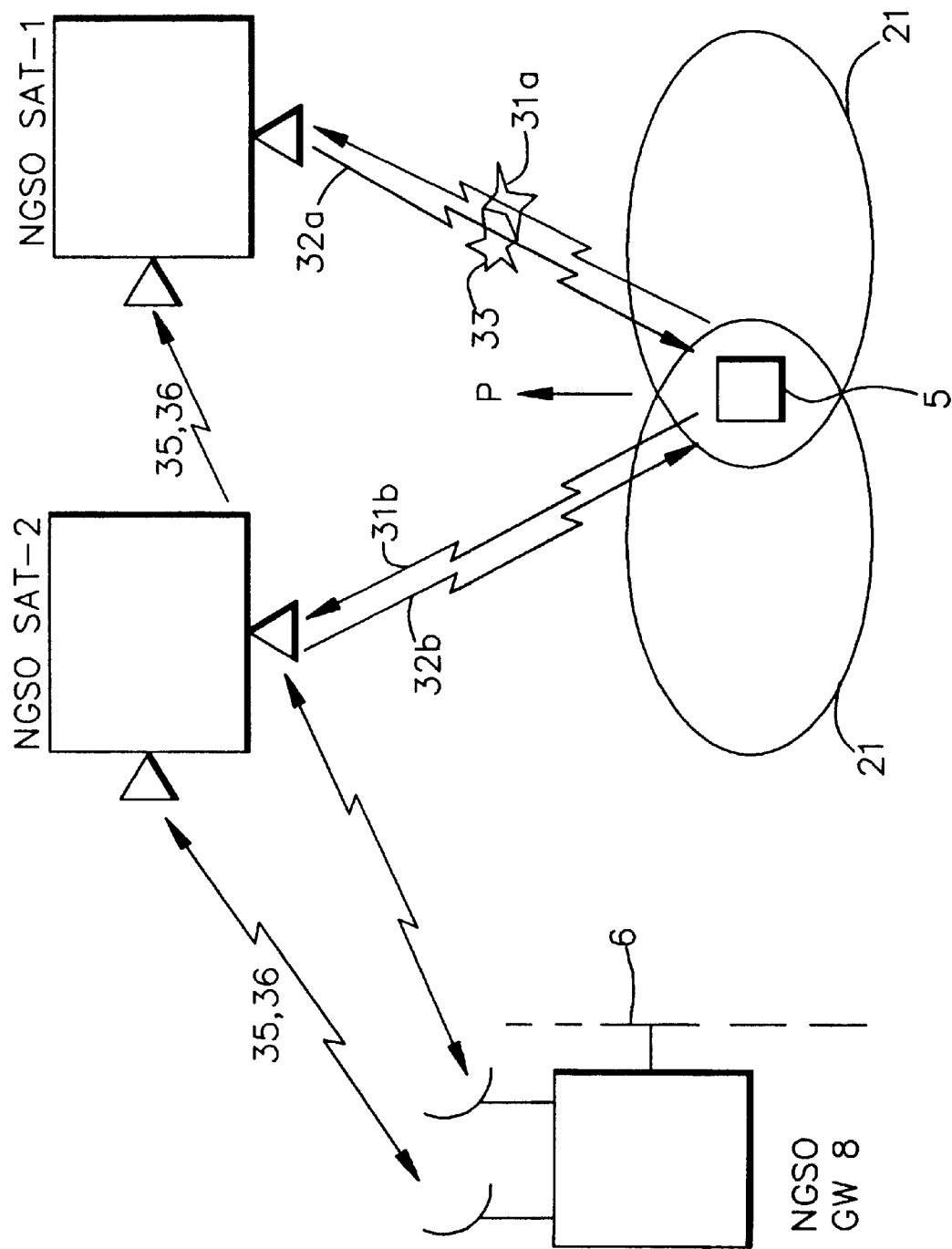
FIG. 4 shows in further detail the overlapped coverage area case of FIG. 3B.

Reference in this regard is made to FIG. 4. The system attempts to link the two NGSO satellites NGSO SAT-1 and NGSO SAT-2 with the user terminal 5. As shown in FIG. 4, the user terminal 5 is transmitting a signal at a power P towards the two satellites simultaneously. The signals received at the user terminal 5 from the two satellites are coherently combined in the user terminal 5 to form a single, composite signal. Reference in this regard can be had to the above-referenced U.S. Pat. No. 5,233,626, issued Aug. 03, 1993, entitled "Repeater Diversity Spread Spectrum Communication System", by S. A. Ames. A final destination for the signal transmitted to the two satellites from the user terminal 5 may be the GSO satellite 3, the NGSO gateway 8, the GSO gateway 7 (via the GSO satellite 3), or another user terminal 5. In any case there is a certain signal received quality necessary at the NGSO satellites 2 to achieve a desired result at the final destination.

As is shown in FIG. 4, one of the uplinks 31a, and perhaps also the downlink 32a, are attenuated by a rain cell 33. The received power P(NGSO SAT-1) at the NGSO SAT-1 is less than the desired level due to the rain attenuation (it being realized that the NGSO SAT-1 is also simultaneously receiving uplinks from other user terminals 5, which may or may not be impaired). By knowing that this impairment is occurring, and the level of the impairment, the system can compensate for this link only (e.g., only the link 31a) while leaving all other user terminals unaffected. Thus energy is conserved and satellite cost and weight is minimized by selectively power controlling a terminal or terminals on a link-by-link basis.

Conventional approaches, such as those described in the various U.S. Patents mentioned in the Background section of this patent application, for compensating for the attenuation in one of the user links employ power control loops that are controlled from the ground, and may require a measurement of signals that are emanating from the ground at a remote receiver located on the ground. This conventional approach has a number of drawbacks and disadvantages.

In accordance with an aspect of this invention, the system employs power control loops (open and/or closed) which individually control the power of each user terminal 5 by means of processing performed in, and power control commands issued from, the space segment of the satellite communications system.

Figure 5:
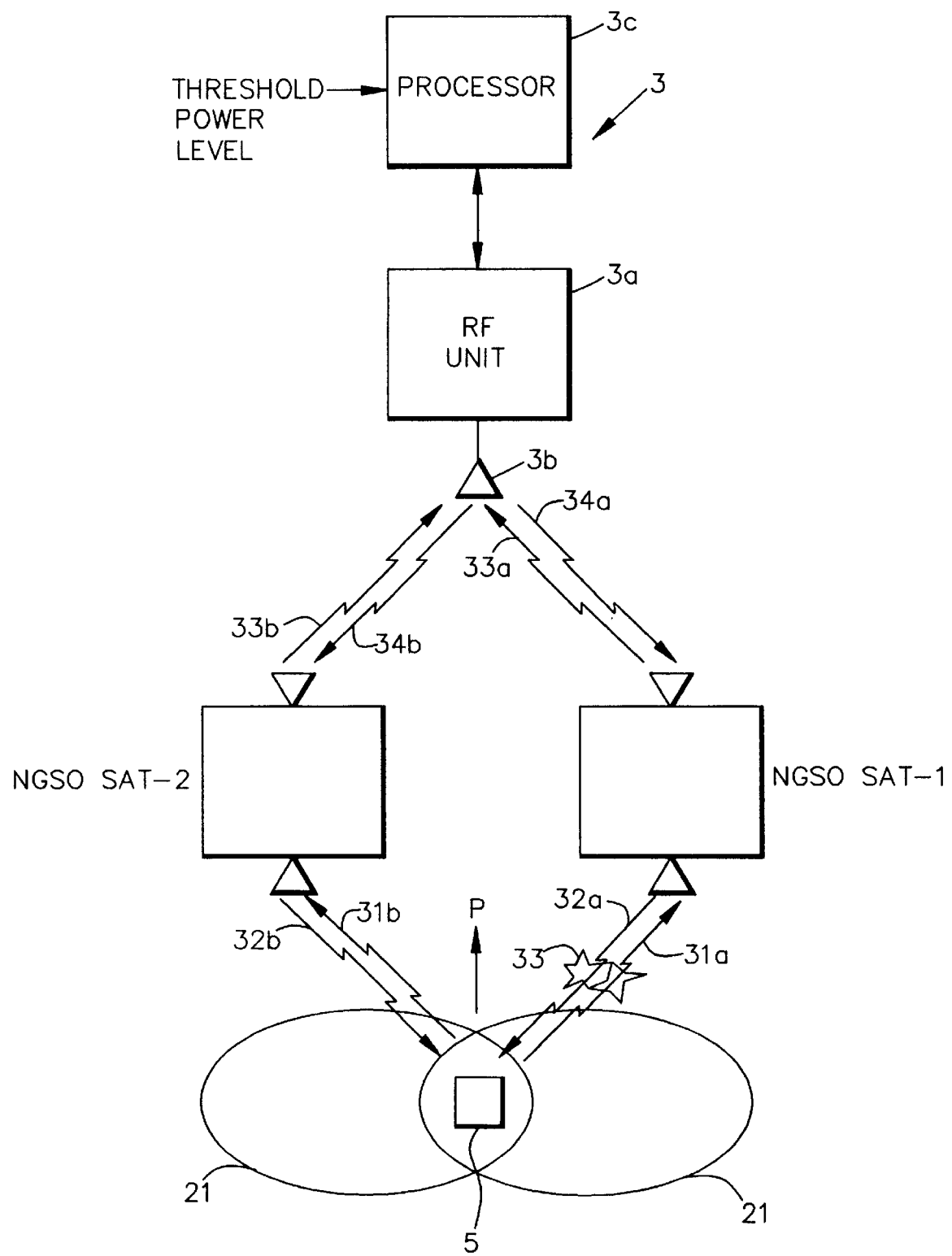
FIG. 5 shows in still further detail the overlapped coverage area case of FIGS. 3B and 4, and further illustrates in simplified block diagram form one of the GSO satellites.

FIG. 5 illustrates a presently preferred technique to control the transmission power of the user terminals 5. The power P transmitted from the user terminal 5 is received from two uplinks 31a and 31b by two different NGSO satellites NGSO SAT-1 and NGSO SAT-2, respectively. As noted before, the signals on each uplink have different strengths due to various impairments (e.g., the presence of the raincell 33).

There are two presently preferred embodiments for implementing this invention. One embodiment assumes that the fading is reciprocal in the two different frequency bands in which the user terminal 5 is receiving and transmitting, thereby only requiring a single compensation link (open loop). The second embodiment individually controls the separate uplinks 31 an downlinks 32 in each frequency band, thereby not requiring any assumption on the fading depth correlation between the uplink and the downlink (closed loop). It should be noted that the closed loop and open loop control can be used together. The closed loop control embodiment is described first, followed by the open loop power control embodiment.

It should first be noted that there are different embodiments for implementing the closed-loop power control in accordance with this aspect of the invention.

A first closed-loop embodiment uses power control of the user terminal 5 uplink signal that is implemented on each NGSO satellite 2 and then relayed to the GSO satellite 3 over uplinks 33. In this case, assume that the path 31a is impaired and is received at NGSO SAT-1 at a lower power level than the desired power level. At the NGSO SAT-1 the received signal may either be demodulated entirely or demodulated partially, and the signal strength information extracted. The signal strength information, when the signal is entirely demodulated, can be a measure or indication of bit error rate or frame error rate. For the case where the signal is not entirely demodulated, the signal strength information can be based on a measure of the received signal strength.

In general, the signal strength information is considered, for the purposes of this invention, to be indicative of the power and quality of the uplink signal 31 as received at a given one of the receiving NGSO satellites 2. For a direct sequence (DS) CDMA embodiment of this invention, it is also desirable to substantially equalize the power of the uplink signals 31 received from each of the user terminals 5 that transmits to a given one of the NGSO satellites 2.

If the signal is completely demodulated and decoded, it is processed by a digital receiver chain 40 as shown in FIG. 6. The digital receiver chain may be conventional in construction and, assuming a DS-CDMA signal, includes a mixer 40a for mixing the uplink RF signal with a local oscillator (LO) signal to generate an IF signal, a despreader 40b that operates in conjunction with a pseudorandom (PN) code generator 40c to correlate with and extract the user terminal's transmission, a demodulator 40d, and a decoder 40e. The output of the decoder 40e is the baseband signal. In this case, the strength of the demodulated output, or the soft decisions made by the demodulator 40d, may be used as a measure of the received signal power. If the transmitted signal is to be only partially regenerated on the satellite 2, any of the blocks 40d and 40e may be omitted, and the signal power level at the output of block 40b may be used as a measure of received signal strength. It is understood that at least some of the circuitry shown in FIG. 6 is replicated for each user terminal 5 that transmits a differently spread signal in the same band of frequencies.

Referring again to FIG. 5, the indication of signal strength of the user terminal 5 obtained as described in FIG. 6 is then transmitted to the GSO satellite 3 by each NGSO satellite 2 over links 33a and 33b. In the GSO satellite 3 the signal strength indications for the uplinks 31a and 31b are received with RF unit 3a from antenna 3b and are passed to a processor 3c. In the processor 3c the two signal strength indications (or more, depending on the number of NGSO satellites 2 that are receiving the user terminal's transmission) are compared to one another. That is, the signal strengths from different paths via several NGSO satellites 2 are compared on the GSO satellite 3. In the example of FIG. 5, the uplink signal 31a received via NGSO SAT-1 is found to be impaired relative to the uplink signal 31b, which does not experience the attenuation due to the raincell 33.

In a preferred embodiment the sum of the signal strength indications received from NGSO SATs 1 and 2 are compared with some desired threshold power or signal strength level. The difference or shortfall S (if any) with respect to this threshold is then transmitted to the NGSO satellites 2 from the GSO satellite 3 over links 34a and/or 34b. This information is then sent to the user terminal 5 through downlinks 32a and/or 32b. In response, the digital portion 5b of the user terminal 5 may then either increase the transmitted power directed towards NGSO SAT-1 and/or towards NGSO SAT-2 by an amount determined by the shortfall S. If S is found to larger than some preset value, for example 10 dB, then it may be more power efficient for the non-impaired path via NGSO SAT-2 to be increased by, for example, 3 dB, rather than attempting to penetrate the impaired path to NGSO SAT-1 with substantially more transmitter power.

A second embodiment for closed-loop power control of the user terminal 5 uplink signal 31 is implemented on the GSO satellite 3. In this embodiment the NGSO satellites 2 simply relay in a linear manner the user terminal's uplink signals 31a directly to the GSO satellite 3, where the GSO satellite 3: (a) receives both relayed uplink signals and, after demodulating same entirely or in part, (b) compares the relayed signals, (c) calculates the power deficit to achieve a desired link quality, and (d) issues power control instructions to the user terminal 5 via one or more of the NGSO satellites 2.

For this embodiment it is assumed that the GSO satellite 3 is equipped with some or all of the circuitry shown in FIG. 6, depending on whether complete or partial demodulation is to be accomplished.

In a third embodiment of closed-loop power control the power control of the user uplink signal is implemented on the NGSO satellite 2 only. As in the above example, the path 31a is assumed to be impaired and is received at the NGSO SAT-1 at a lower level than that desired. This signal could either be demodulated entirely or partially and the signal strength information extracted as described previously for the first embodiment.

The user terminal 5 is also transmitting its power toward the NGSO SAT-2 on link 31b. This link may be impaired as well but, in general, is impaired less due to the concentration of the raincell 33 in the direction of link 31a. The link 31b signal is received at the NGSO SAT-2 at a higher level than the same signal received at NGSO SAT-1. The received signal may either be demodulated entirely or partially and the signal strength information extracted as described above.

In this embodiment each NGSO satellite 2 independently determines whether the signal strength of the respective uplink 31a or 31b should to be increased or decreased. Each NGSO satellite 2 sends a signal to the user terminal 5 to adjust the transmitter power appropriately. In a preferred embodiment, the user terminal 5 adjusts its transmitted signal power so as to agree with the lesser of the two commanded power levels. Alternatively, the signal strength may be adjusted to some intermediate value that lies between the two commanded power levels.

In this embodiment the NGSO satellites 2 may also relay the power control commands as well to the GSO satellite 3 over links 33a and 33b. In this case the GSO satellite 3 functions as a slower longer-delay power controller. That is, the NGSO satellites 2 relay the power control commands to the user terminal 5 in a shorter-delay power control loop (for example, one power control command per frame period (e.g., 20 milliseconds)) and then, in a longer power control loop (e.g., once per n frame periods, where n is greater than one), the GSO satellite 3 transmits an overriding power control command to the user terminal 5 through one or both the NGSO satellites 2. After setting its transmitted power at the commanded value received from the GSO satellite 3, the shorter-delay power control loop is used to provide adjustments to the longer term value for the next n frame periods.

The NGSO satellites 2 may also transmit control messages to one another through inter-satellite links and thus cooperate to determine the appropriate power control command that should be transmitted to the user terminal 5. In this case the GSO satellite 3 is not required. If NGSO inter-satellite links are not used, then the GSO satellite 3 can be employed to exchange the messages between the NGSO satellites 2 that are receiving the user terminal's transmissions.

The foregoing description has been presented in the context of power controlling the user terminal uplink 31. However, power control of the downlink 32 cat also be accomplished. In this case the user terminal 5 detects that the downlink 32a from NGSO SAT-1 is faded, and that the downlink 32b from NGSO SAT-2 is being received with a better quality (e.g., larger received signal strength, fewer bit or frame errors, etc.). The user terminal 5 determines the necessary increase in power from NGSO SAT-1 to compensate for the attenuation in the downlink 32a (for example, to equalize it to the downlink 32b), and communicates this amount either directly to NGSO SAT-l, or to NGSO SAT-2 which relays the power increase request via the GSO satellite 3 to the NGSO SAT-1 (or on a control signal crosslink to NGSO SAT-1). If the fading is severe, it may be preferred to instead increase the power on the "good" link by, for example, 3 dB, rather than attempting to use the "bad" link. This decision can be made by comparing the signal levels received from the two links 32a and 32b.

Having thus explained the closed-loop embodiments in accordance with an aspect of this invention, the open-loop embodiment will now be described. This embodiment is premised on the assumption that if a close correlation can be made between fades in the downlink and the uplink, an open loop power control scheme can be implemented using the correlation. For example, if it is found that the uplink fades with a ratio R to the fade on the downlink (due to the difference in frequency between the uplink and downlink), this ratio can be used to implement the open-loop power control. By example, the user terminal 5 detects that the downlink 32a from NGSO SAT-1 is faded. In response, the user terminal 5 autonomously increases the transmitted power in the uplink 31a to NGSO SAT-1 according to the fade observed in the downlink and the ratio R.

It should be noted that the user terminal 5 may distinguish these transmissions by the use of different spreading codes and/or source identification bits that are inserted into the data stream. The same technique can be used to distinguish the sources of different power control commands for the closed loop embodiment described previously.

Again, if the fading is severe, it may be preferable to increase the uplink power on the non-faded path by, for example, 3 dB, rather than attempting to use the path that is experiencing the fade. This decision can be made by comparing the signal levels received from the two paths.

Figure 7:
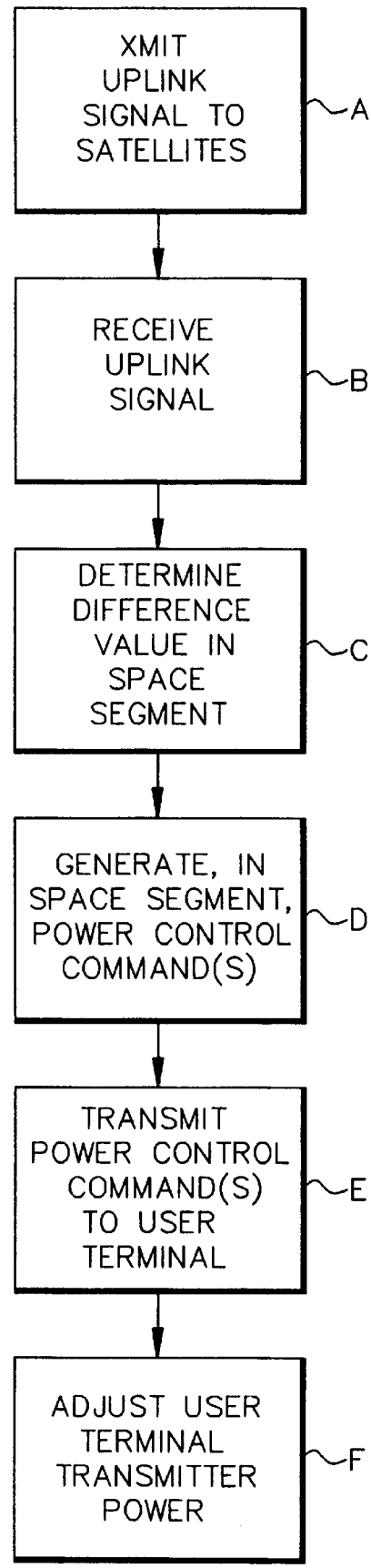
FIG. 7 is a logic flow diagram in accordance with a method of this invention.

It should thus be clear that this invention teaches a method, and referring to FIG. 7, that includes the steps of (A) transmitting an uplink signal from the user terminal simultaneously to at least two satellites of the space segment; (B) receiving the uplink signal with each of the at least two satellites; (C) determining, in the space segment, a difference value representing a difference between a received signal strength indication and a desired received signal strength indication for each of the at least two satellites; (D) in response to the difference value, generating in the space segment at least one power control command for use by the user terminal; (E) transmitting the at least one generated power control command from the space segment to the user terminal; and (F) adjusting a transmitted power of the uplink signal in accordance with the at least one power control command.

Although described above primarily in the context of a space segment having low earth orbit and geosynchronous earth orbit satellites, it should be realized that the teaching of this invention applies as well to a satellite communications system that includes low earth orbit and medium earth orbit satellites, as well as to medium earth orbit and geosynchronous earth orbit satellites.

Thus, while the invention has been particularly shown and described with respect to preferred embodiments thereof, it will be understood by those skilled in the art that changes in form and details may be made therein without departing from the scope and spirit of the invention.

What is claimed is:

1. A method for controlling the transmission power of a user terminal in a satellite communications system of a type that includes a ground segment comprised of at least one user terminal, and a space segment comprised of a plurality of satellites in a non-geosynchronous earth orbit, comprising the steps of:

transmitting an uplink signal from the user terminal simultaneously to at least two satellites of the space segment;

receiving the uplink signal with each of the at least two satellites;

determining in the space segment a difference value representing a difference between a received signal strength indication and a desired received signal strength indication for each of the at least two satellites;

in response to the difference value, generating in the space segment at least one power control command for use by the user terminal;

transmitting the at least one generated power control command from the space segment to the user terminal; and adjusting a transmitted power of the uplink signal in accordance with the at least one power control command;

wherein the step of receiving the uplink signal includes a step of relaying the received uplink signal to a third satellite, and further comprising the steps of demodulating or partially demodulating the relayed uplink signal in the third satellite to determine the difference value, and wherein the step of generating the at least one power control command is performed by the third satellite.

2. A method as set forth in claim 1, wherein the step of receiving the uplink signal includes a step of demodulating the received uplink signal to baseband.

3. A method as set forth in claim 1, wherein the step of receiving the uplink signal includes a step of despreading the received uplink signal with a spreading code assigned to the user terminal.

4. A method as set forth in claim 1, wherein the step of receiving includes a step of transmitting the received uplink signal to a terrestrial gateway for connection to a terrestrial communications network.

5. A method for controlling the transmission power of a user terminal in a satellite communications system of a type that includes a ground segment comprised of at least one user terminal, and a space segment comprised of a plurality of satellites in a non-geosynchronous earth orbit, comprising the steps of:

transmitting an uplink signal from the user terminal simultaneously to at least two satellites of the space segment;

receiving the uplink signal with each of the at least two satellites;

determining in the space segment a difference value representing a difference between a received signal strength indication and a desired received signal strength indication for each of the at least two satellites;

in response to the difference value, generating in the space segment at least one power control command for use by the user terminal;

transmitting the at least one generated power control command from the space segment to the user terminal; and adjusting a transmitted power of the uplink signal in accordance with the at least one power control command, wherein the steps of generating and transmitting the at least one power control command occur at first intervals, and further comprising a step of generating an override power control command and transmitting the generated override power control command to the user terminal at second intervals, wherein the second intervals are longer than the first intervals.

6. A method as set forth in claim 5, wherein the step of determining is accomplished in each of the at least two satellites, and further including a step of transmitting the determined difference value from each of the at least two satellites to a third satellite in a higher orbit.

7. A method as set forth in claim 6, wherein the third satellite is in one of a medium earth orbit or a geosynchronous earth orbit.

8. A method as set forth in claim 6, wherein the step of generating the at least one power control command is performed by the third satellite.

9. A method as set forth in claim 5, wherein the power control commands that are generated and transmitted at the first intervals are generated by the at least two satellites of a constellation of low earth orbit or medium earth orbit satellites, and wherein the override power control command is generated and transmitted by a third satellite in a higher altitude earth orbit than the at least two satellites.

10. A method as set forth in claim 5, wherein the step of receiving the uplink signal includes a step of demodulating the received uplink signal to baseband.

11. A method as set forth in claim 5, wherein the step of receiving the uplink signal includes a step of despreading the received uplink signal with a spreading code assigned to the user terminal.

12. A method as set forth in claim 5, wherein the step of receiving includes a step of transmitting the received uplink signal to a terrestrial gateway for connection to a terrestrial communications network.

13. A satellite communications system of a type that includes a ground segment, comprised of at least one user terminal and at least one terrestrial gateway, and a space segment, comprised of a plurality of satellites in a non-geosynchronous earth orbit, and further comprising:

a transmitter in said user terminal for transmitting an uplink signal simultaneously to at least two satellites of said space segment;

a receiver in each of the at least two satellites for receiving the uplink signal;

a first controller in said space segment for determining a difference value representing a difference between a received signal strength indication and a desired received signal strength indication for each of the at least two satellites;

a second controller in said space segment that is response to the difference value for generating at least one power control command for use by said user terminal;

a transmitter in said space segment for transmitting the at least one generated power control command to the user terminal; and means in said user terminal for adjusting a transmitted power of the uplink signal in accordance with the at least one power control command;

wherein said receiver is coupled to a transmitter for relaying the received uplink signal to a third satellite, said third satellite comprising means for demodulating or partially demodulating the relayed uplink signal, and further comprising said first and second controllers.

14. A system as set forth in claim 13, wherein said receiver includes circuitry for demodulating the received uplink signal to baseband.

15. A system as set forth in claim 13, wherein said receiver includes circuitry for despreading the received uplink signal with a spreading code assigned to the user terminal.

16. A system as set forth in claim 13, wherein the third satellite is in one of a medium earth orbit or a geosynchronous earth orbit.

17. A system as set forth in claim 13, wherein said receiver has an output coupled to a transmitter for transmitting the received uplink signal to a terrestrial gateway for connection to a terrestrial communications network.

18. A satellite communications system of a type that includes a ground segment, comprised of at least one user terminal and at least one terrestrial gateway, and a space segment, comprised of a plurality of satellites in a non-geosynchronous earth orbit, and further comprising:

a transmitter in said user terminal for transmitting an uplink signal simultaneously to at least two satellites of said space segment;

a receiver in each of the at least two satellites for receiving the uplink signal;

a first controller in said space segment for determining a difference value representing a difference between a received signal strength indication and a desired received signal strength indication for each of the at least two satellites;

a second controller in said space segment that is response to the difference value for generating at least one power control command for use by said user terminal;

a transmitter in said space segment for transmitting the at least one generated power control command to the user terminal; and means in said user terminal for adjusting a transmitted power of the unlink signal in accordance with the at least one power control command, wherein said first and second controller are located in each of said at least two satellites and generate and cause to be transmitted, at first intervals, the at least one power control command, and further comprising, in a satellite that orbits at a higher altitude than said at least two satellites, a further first and second controller for generating an override power control command that is transmitted to said user terminal at second intervals, wherein the second intervals are longer than the first intervals.

19. A system as set forth in claim 18, and further including means for transmitting the determined difference value between each of the at least two satellites directly or through at least one other satellite.

20. A system as set forth in claim 18, wherein the at least two satellites are a portion of a constellation of low earth orbit satellites, and wherein the third satellite in one of a medium earth orbit or a geosynchronous earth orbit.

21. A system as set forth in claim 18, wherein said receiver includes circuitry for demodulating the received uplink signal to baseband.

22. A system as set forth in claim 18, wherein said receiver includes circuitry for despreading the received uplink signal with a spreading code assigned to the user terminal.

23. A satellite communications system, comprising:

a plurality of user terminals each having a transmitter and a receiver;

at least one gateway bidirectionally coupled to a terrestrial communications network;

a plurality of satellites in earth orbit, at least some of said satellites comprising means for receiving communication signals from said user terminals over communication paths and means for transmitting said received communications signals to said at least one gateway; and a power control function distributed in said plurality of satellites for generating transmitter power control commands individually for said plurality of user terminals for compensating individual ones of said user terminals for communication path impairments;

wherein said transmitter power control commands are generated at first intervals and transmitted to respective ones of said user terminals, and further comprising at least one satellite that orbits at a higher altitude than said satellites that comprise means for receiving communication signals from said user terminals and for transmitting said received communications signals to said at least one gateway, said at least one satellite generating an override power control command that is transmitted to respective ones of user terminals at second intervals that are longer than the first intervals.

24. A satellite communications system of a type that includes a ground segment, comprised of at least one user terminal and at least one terrestrial gateway, and a space segment, comprised of a plurality of satellites in a non-geosynchronous earth orbit, and further comprising:

a transmitter in said user terminal for transmitting an uplink signal simultaneously to at least two satellites of said space segment;

a receiver in each of the at least two satellites for receiving the uplink signal;

a first controller in said space segment for determining a difference value representing a difference between a received signal strength indication and a desired received signal strength indication for each of the at least two satellites;

a second controller in said space segment that is response to the difference value for generating at least one power control command for use by said user terminal;

a transmitter in said space segment for transmitting the at least one generated power control command to the user terminal; and means in said user terminal for adjusting a transmitted power of the uplink signal in accordance with the at least one power control command;

wherein said receiver is coupled to a transmitter for relaying the received uplink signal to a third satellite, said third satellite comprising means for demodulating or partially demodulating the relayed uplink signal, wherein said first controller that determines the difference value is located in each of the at least two satellites, and wherein said second controller is located in said third satellite.

25. A system as in claim 24, and further including means for transmitting the determined difference value from each of the at least two satellites and said third satellite.

26. A system as in claim 24, wherein the third satellite in one of a medium earth orbit or a geosynchronous earth orbit.

* * * * *